United States Patent [19]

Ishino et al.

[11] Patent Number: 5,164,105

[45] Date of Patent: Nov. 17, 1992

[54] ELECTROVISCOUS FLUID

[75] Inventors: Yuichi Ishino, Fuchu; Shigeki Endo, Kodaira; Toshiyuki Osaki; Hideaki Nomura, both of Murayama; Toshio Chikaraishi, Akishima; Seisuke Tomita, Tokorozawa, all of Japan

[73] Assignee: Bridgestone Corporation, Tokyo, Japan

[21] Appl. No.: 683,486

[22] Filed: Apr. 9, 1991

Related U.S. Application Data

[63] Continuation of Ser. No. 334,305, Apr. 6, 1989, abandoned.

[30] Foreign Application Priority Data

Apr. 19, 1988 [JP] Japan .................. 63-94550

[51] Int. Cl.$^5$ .................................................. C09K 3/00
[52] U.S. Cl. ........................... 252/78.3; 252/77; 252/315.1; 252/572; 524/268; 556/425
[58] Field of Search ............. 252/77, 78.3, 309, 315.1; 106/287.13; 524/268; 556/425

[56] References Cited

U.S. PATENT DOCUMENTS

| | | | |
|---|---|---|---|
| 4,129,513 | 12/1978 | Stangroom | 252/78.1 |
| 4,502,973 | 3/1985 | Stangroom | 252/73 |
| 4,528,390 | 7/1985 | Kimura | 556/450 |
| 4,645,614 | 2/1987 | Goossens et al. | 252/309 X |
| 4,668,417 | 5/1987 | Goossens et al. | 252/77 X |
| 4,702,855 | 10/1987 | Goossens et al. | 252/74 X |
| 4,772,407 | 9/1988 | Carlson | 252/74 |
| 4,994,198 | 2/1991 | Chung | 252/78.3 X |
| 5,032,307 | 7/1991 | Carlson | 252/78.3 X |

FOREIGN PATENT DOCUMENTS 3427499 2/1986 Fed. Rep. of Germany .
31221 7/1985 Japan .

*Primary Examiner*—Robert L. Stoll
*Assistant Examiner*—Daniel S. Metzmaier
*Attorney, Agent, or Firm*—Frishauf, Holtz, Goodman & Woodward

[57] ABSTRACT

An electroviscous fluid comprising:
1 to 60% by weight of a dispersed phase comprising a fine powder of a silicone resin containing a hydrocarbon group substituted with an amino group or an ammonium group, the fine powder containing 0.1 to 20% by weight of water and having an average particle size of 0.05 to 100 μm; and
40 to 99% by weight of a liquid phase comprising an electrically insulating oil having a viscosity at 25° C. of 0.65 to 500 cSt.

19 Claims, 2 Drawing Sheets

ELECTROVISCOUS FLUID

This application is a continuation of application Ser. No. 07/334,305, filed Apr. 6, 1989 now abandoned.

BACKGROUND OF THE INVENTION

1. Field of the Invention

This invention relates to an electroviscous fluid which is increased in viscosity by application of a voltage.

2. Background Information

An electroviscous fluid is a suspension in which finely divided hydrophilic solids are dispersed in a hydrophobic and non-electroconductive oil, which is increased in viscosity of the fluid extremely rapidly and yet reversibly under the action of a sufficiently strong electric field to become a plastic or solid state.

For varying the viscosity, not only a direct current electric field, but also an alternate current electric field can be used, and a strong force can be given with a very small necessary current, little power, and therefore electroviscous fluids have been used as the constituent element in, for example, the clutch, hydraulic valve, shock absorber, vibrator, antivibration rubber or the electrical-mechanical interface for controlling the system to hold a workpiece at a normal position, etc.

In the prior art, as the dispersed phase constituents of an electroviscous fluid, solid fine particles have been employed, and as the solid fine particles, cellulose, starch, silica gel, ion-exchange resin, etc. with water adsorbed on the surface and formed into fine particles have been known. As the liquid phase component, which is the other component, PCB, butyl sebacate, transformer oil, chlorinated paraffin, silicone oil, etc. have been known. However, these materials are poor in practical value, and there exists yet no electroviscous fluid of extremely high performance and high stability which is of available practical value.

One reason why no electroviscous fluid has been provided for practical application is because the specific gravity of the solid fine particles, which become the dispersed phase, is generally greater than that of the liquid phase component, whereby phase separation occurs when left to stand for a long term to effect sedimentaion, thereby forming precipitates which can be dispersed again with difficulty.

As a means for solving such problem, there is the method in which solid fine particles with a small specific gravity is employed to make the difference in specific gravity from the liquid phase component smaller and the method in which a liquid phase component with larger specific gravity is employed to make the difference in specific gravity from the solid fine particles smaller.

However, in the case of the former method, solid fine particles are limited to an organic material, such as starch, and therefore electrical characteristics are lacking in stability over a long term and practical applicability becomes poor.

Accordingly, when an improvement of electroviscous effect is aimed at, as disclosed in U.S. Pat. No. 4,129,513, solid fine particles with large specific gravity to some extent cannot but be used. However, lithium polyacrylate used as the dispersed phase fine particles in the above published specification has a specific gravity of about 1.4 to 1.5, and therefore no hydrocarbon type oil with a small specific gravity generally employed as an electrically insulating oil cannot be used.

Accordingly, when solid fine particles with a somewhat great specific gravity are to be used for the purpose of improving the electroviscous effect, the latter method has been employed. As an example of the latter method, there is the method disclosed in U.S. Pat. No. 4,502,973. However, in the above published specification, a compound with a great specific gravity, such as a halogenated diphenylmethane similar in structure to PCB, the use of which is prohibited as being very harmful to the human body, is employed as the liquid phase, and therefore this technique is not satisfactory in practical applicability.

Also, in many constituent elements utilizing an an electroviscous fluid, electroviscous fluid is used in direct contact with a material having a rubbery elasticity, and therefore one may consider to employ an electrically insulating oil, such as silicone oil, which does not swell or a denatured rubbery elastic material as the liquid phase. In DE-3427499, from this standpoint, an electroviscous fluid is proposed in which silica gel is used as the dispersed phase and silicone oil as the liquid phase, and further an amino functional, hydroxy functional, acetoxy functional or alkoxy functional polysiloxane group is used as the dispersing agent. However, due to the great difference in specific gravity beween silia gel and silicone oil, the particles of the dispersed phase are sedimented when left to stand for a long term, to cause phase separation and can be dispersed again with difficulty.

Also, in Japanese Patent Publication No. 31221/1985, there is disclosed the method in which an ion-exchange resin formed into fine powder is used as the dispersed phase. However, this technique uses a resin comprising a crosslinked styrene polymer as the basic skelton, which has no affinity for silicone oil, and when phase separation is once generated, redispersion becomes difficult. Thus, these fluids are also practically unavailable under the present situation.

Accordingly, an object of the present invention is to develop an electroviscous fluid which solves the above problems, is stable for a long term and can exhibit a high electroviscous effect.

SUMMARY OF THE INVENTION

The electroviscous fluid of the present invention comprises:

1 to 60% by weight of a dispersed phase comprising a fine powder of a silicone resin containing an hydrocarbon group substituted with an amino group or an ammonium group, said silicone resin fine powder containing 0.1 to 20% by weight of water and having an average particle size of 0.05 to 100 $\mu$m; and 40 to 99% by weight of a liquid phase comprising an electrically insulating oil having a viscosity at 25° C. of 0.65 to 500 cSt.

DESCRIPTION OF THE PREFERRED EMBODIMENTS

Figure 1:
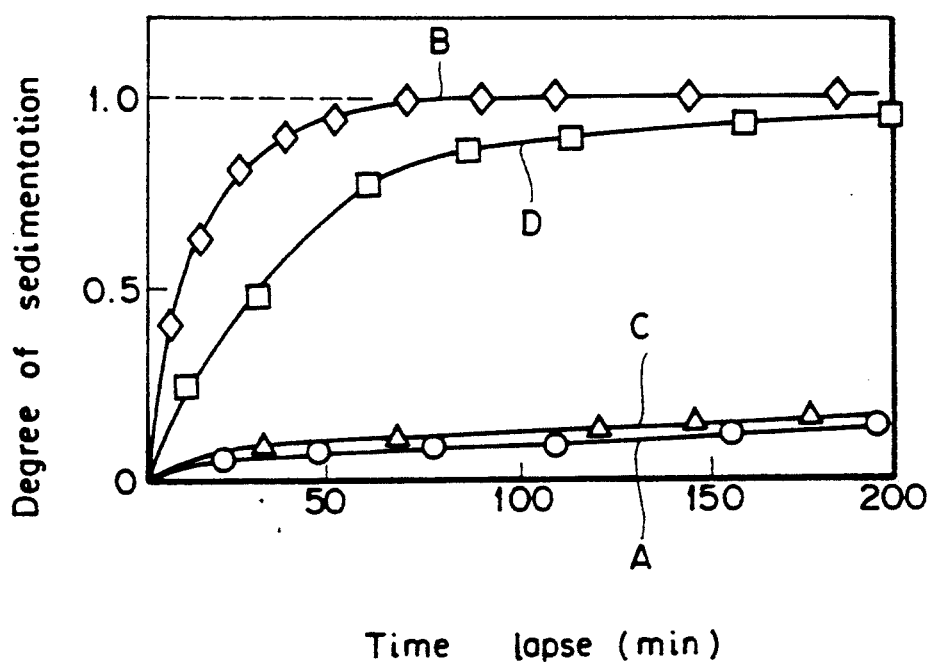
FIG. 1 is a diagram showing the manner how the dispersed phase in the electroviscous fluid of the present invention is sedimented, in which lines A, B, C and D correspond to the results of Example 1, Comparative Examples 1, 2 and 3, respectively.

The dispersed phase constituting the electroviscous fluid of the present invention comprises a fine powder of a silicone resin containing a hydrocarbon group substituted with an amino group or an ammonium group, said silicone resin fine powder containing a predetermined amount of water (hereinafter called "silicone resin fine powder").

As the silicone resin fine powder, there can be exemplified a homopolymer comprising $RSiO_{3/2}$ units (wherein R represents a monovalent hydrocarbon which may be unsubstituted or substituted with an amino group or an ammonium group); or a polymer comprising $RSiO_{3/2}$ units (wherein the meaning of R is the same as defined above) and $SiO_2$ units; or a copolymer comprising $RSiO_{3/2}$ units and/or $SiO_2$ units and $R_2SiO$ units (wherein the meaning of R is the same as defined above), and wherein 0.1 mol % or more of the groups R in the molecule are hydrocarbon groups substituted with an amino group or ammonium group.

When the silicone resin fine powder is a copolymer comprising $RSiO_{3/2}$ units and $SiO_2$ units, the ratio of the respective constituent units contained is not particularly limited.

In the case of a copolymer comprising $RSiO_{3/2}$ units and/or $SiO_2$ units and $R_2SiO$ units, the content of $RSiO_{3/2}$ units and/or $SiO_2$ units is 80 to 100 mol %. If the content of $RSiO_{3/2}$ units and/or $SiO_2$ units is less than 80 mol %, that is when the content of $R_2SiO$ units exceeds 20 mol %, it is difficult to form the resulting silicone resin as a fine powder.

The silicone resin fine powder constituting the dispersed phase contains a hydrocarbon group substituted with an amino group or an ammonium group (hereinafter called "substituted hydrocarbon group") as the group R in its constituent units. The content of the substituted hydrocarbon group may be preferably 0.1 mol % or more. When the content is less than 0.1 mol %, substantially no electroviscous effect will be exhibited when used as the dispersed phase of an electroviscous fluid. The preferable content of the substituted hydrocarbon group may be 0.1 to 50 mol %.

Examples of the substituted hydrocarbon group may include those as represented by the following formulae, including hydrocarbon groups substituted with quaternary ammonium salts, an amino group such as a primary amine, secondary amine and tertiary amine, or an ammonium group, and all of them are bonded through the carbon group of $Q^1$ to the silicon atom.:

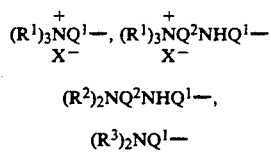

(wherein $R^1$ represents an alkyl group having 1 to 20 carbon atoms; $R^2$ represents a hydrogen atom, an alkyl group or an aminoalkyl group; $X^-$ represents an anion; $R^3$ represents a hydrogen atom, an alkyl group or a phenyl group; $Q^1$ represents an alkylene group having 3 to 6 carbon atoms; and $Q^2$ represents an alkylene gorup having 2 to 4 carbon atoms).

The $R^1$'s may be the same or different from each other, and the alkyl group having 1 to 20 carbon atoms can be exemplified by methyl, ethyl, propyl, butyl, pentyl, hexyl, octyl, decyl, dodecyl, tetradecyl, hexadecyl, octadecyl, eicosyl groups and the like. Among them, for easiness in synthesis, of the three groups, $R^1$ bonded to one nitrogen atom, at least two should be preferably methyl groups. In this case, the remainder group $R^1$ may be preferably an alkyl group having 12 to 18 carbon atoms for easiness in availability.

Examples of the alkylene group having 3 to 6 carbon atoms for $Q^1$ may include trimethylene, tetramethylene, pentamethylene and hexamethylene groups, and the trimethylene group is preferred for easiness in synthesis and handling.

As the alkylene group having 2 to 4 carbon atoms for $Q^2$, the ethylene, trimethylene and tetramethylene group can be exemplified.

As X which forms an anion of $X^-$, the chlorine atom, bromine atom and iodine atom can be exemplified. Among them, for easiness in availability of the starting material and handling, the chlorine atom is preferred, but other ion species can be also selected as the counterion as a matter of course. Also, when the compound has two nitrogen atoms, either one of the nitrogen atoms may be a quaternary ammonium group.

The $R^2$'s may be the same or different from each other, and examples of the alkyl group may include the same as mentioned for $R_1$. As the amino alkyl group, the $\gamma$-aminopropyl group, N-(methyl-$\gamma$-aminopropyl group, N-phenyl-$\gamma$-aminopropyl group, N-($\beta$-aminoethyl)-$\gamma$-aminopropyl group, etc. can be included.

The $R_3$'s may be the same or different from each other, and examples of the alkyl group may include the same as mentioned for $R_1$.

Of these, the quaternary ammonium group containing hydrocarbon groups may include the following:

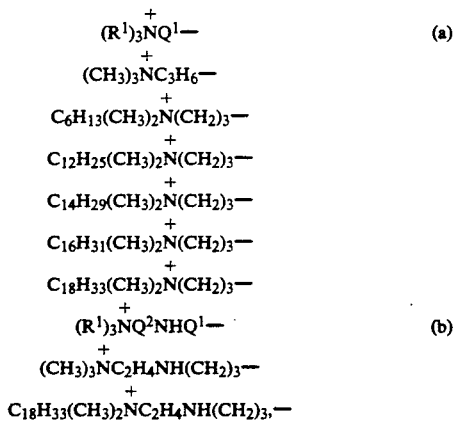

As the group R in the constituent unit other than substituted hydrocarbon groups, alkyl groups such as methyl, ethyl, propyl, butyl, pentyl, hexyl groups, etc.; or a phenyl group may be exemplified as preferable ones. Among these, the methyl group and phenyl group are preferred, because excellent heat resistance can be imparted to the silicone resin fine powder obtained, and particularly the methyl group is preferred for easiness in synthesis.

The silicone resin fine powder constituting the dispersed phase can be obtained by (CO-) hydrolysis of an alkoxysilane having a substituted hydrocarbon group alone or the above alkoxysilane and an alkoxysilane having a desired number of silicon functional groups other than the above substituted hydrocarbon group.

Representative examples of the alkoxysilane having a substituted hydrocarbon group may include the following:

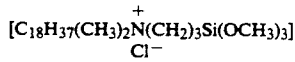

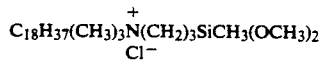

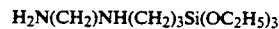

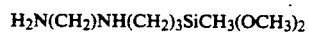

Examples of the alkoxysilane having no substituted hydrocarbon group may include tetraalkoxysilanes, such as normal methyl silicate and normal ethyl silicate, normal isopropyl silicate, normal butyl silicate; organotrialkoxysilanes, such as methyltrimethoxysilane, methyltriethoxysilane, methyltriisopropoxysilane, hexyltrimethoxysilanem and phenyltrimethoxysilane; diorganodialkoxysilanes, such as dimethyldimethoxysilane and dimethyldiethoxysilane. Among these, for having adequate hydrolyzability, normal ethyl silicate and methoxysilanes are preferred.

These alkoxysilanes can be subjected directly or after conversion into the corresponding silanol compounds by hydrolysis to a polycondensation reaction in water or a water-alcohol mixture in the presence of a compound of which an aqueous solution exhibits alkalinity such as ammonia, followed by a drying treatment, to obtain the desired silicone resin fine powder having a substituted hydrocarbon group.

The hydrolysis reaction should be preferably carried out in the presence of an organic acid, such as acetic acid. Also, a necessary alkoxy silane can be formulated to a desired formulation ratio to effect co-hydrolysis, or alternatively the aqueous solutions of the silanol compounds obtained by carrying out separately hydrolysis, respectively may be also mixed before the polycondensation reaction. The conditions for the hydrolysis reaction and polycondensation reaction are not particularly limited, and may also differ depending on the kind of the above alkoxysilane and the hydrolysis method. For example, the reaction can be carried out at a temperature ranging from $-20°$ to $150°$ C., preferably from $-5°$ to $80°$ C. The time for the polycondensation reaction may be sufficiently within the range from several minutes to about 40 hours.

As the method for preparing the silicone resin fine powder, other than the above method, there can be applied the method in which a polyorganosilsesquioxane fine powder is previously prepared according to the method shown in Japanese Unexamined Patent Publication No. 13813/1985 and its surface is treated with an alkoxysilane having a substituted hydrocarbon group as described above.

The silicone resin fine powder constituting the dispersed phase contains 0.1 to 20% by weight, preferably 0.5 to 5% by weight of water. If the water content is less than 0.1% by weight, the fine powder will exhibit substantially no electroviscous effect, while fine powder with a water content exceeding 20% by weight will excessively consume power.

The silicone resin fine powder has an average particle size in the range from 0.05 to 100 $\mu$m, preferably from 1 to 20 $\mu$m. With a particle size less than 0.05 $\mu$m, the initial viscosity in the absence of an electric field will become remarkably large to give a small electroviscous effect, while with a particle size over 100 $\mu$m, no sufficient stability as the dispersed phase in fluid can be obtained.

In the silicone resin fine powder, a specific gravity of the dispersed phase constituted thereof should be preferably in the range from 0.9 to 1.3.

As the electrically insulating oil constituting the liquid phase, hydrocarbons, ester type oils, aromatic type oils, silicone oils, etc. can be exemplified. These can be used alone, or also in combinations of two or more kinds. Among these electrically insulating oils, silicone oils, such as polydimethylsiloxane or polymethylphenylsiloxane, are excellent in that they can be also used under the state directly contacted with a material having rubbery elasticity.

As such electrically insulating oil, one having a specific gravity approximate to that of the dispersed phase is preferred for solving the problem of sedimentation of silicone resin fine powder.

The electrically insulating oil used may have a viscosity at 25° C. of 0.65 to 500 cSt, preferably 10 to 50 cSt. If the viscosity of the liquid phase is too low, volatiles are increased in amount to worse the stability of the liquid phase. If the liquid phase is too high in a viscosity, the initial viscosity in the absence of an electric field becomes higher, whereby the viscosity change due to the electroviscous effect becomes smaller. Also, by employing an electrically insulating oil with an adequately low viscosity as a liquid phase, the dispersed phase can be suspended with good efficiency.

The ratio of the dispersed phase and the liquid phase constituting the electroviscous fluid of the present invention may be 1 to 60% by weight, preferably 20 to 50% by weight, for the content of the dispersed phase comprising the above silicone resin fine powder, and 40 to 99% by weight, preferably 50 to 80% by weight, for the content of the liquid phase comprising the above described electrically insulating oil. If the content of the dispersed phase is less than 1% by weight, the electroviscous effect is small, while the initial viscosity in the absence of an electric field becomes remarkably large if it exceeds 60% by weight.

In the electroviscous fluid of the present invention, additives such as surfactants, dispersing agents, inorganic salts, etc. can be formulated within the range which does not impair the effect of the present invention.

The present invention is described in more detail by referring to the following Examples.

EXAMPLE 1

300 Parts of water, 300 parts of methanol and 10 parts of 28% aqeuous ammonia were homogeneously mixed to prepare a hydrolyzing solution. While this solution was stirred with maintaining the temperature at 30° C., a mixture of 300 parts of a methanol solution containing 40% of octadecylmethyl(trimethoxysilylpropyl)ammonium chloride and 150 parts of methyltrimethoxysilane was added, followed further by stirring, whereby a fine powdery silicone resin was formed and the liquid became turbid. Then, the fine powder formed was aspiration filtered and dried at 150° C. The water content after drying was adjusted to 2.3% by weight to provide the dispersed phase component. The specific gravity was 1.1.

Subsequently, 40% by weight of the silicone fine powder with an average particle size of 8 μm fractionated was well dispersed in 60% by weight of a silicone oil (TSF 451-20, manufactured by Toshiba Silicone K. K.) having a viscosity at 25° C. of 20 cSt (specific gravity 0.95), which is the liquid phase component to obtain an electroviscous fluid as the suspension.

EXAMPLE 2

An amount of 40% by weight of the carbon functional silicone resin fine powder obtained in Example 1 was well dispersed in 60% by weight of a naphthenic oil having a viscosity at 25° C. of 25 cSt and a specific gravity of 0.9 to obtain an electroviscous fluid as the suspension.

EXAMPLES 3 AND 4

According to the formulation ratios shown in Table 1, silicone resin fine powders containing substituted hydrocarbon groups were obtained in the same manner as in Example 1 (Example 3: water content 3.4%, specific gravity 1.1; Example 4: water content 2.1%, specific gravity 1.1). An amount of 40% by weight of the silicone resin fine powder was well dispersed in 60% by weight of a silicone oil having a viscosity at 25° C. of 20 cSt (specific gravity 0.95) to obtain an electroviscous fluid as the suspension.

TABLE 1

| Formulation ratio | Example 3 | Example 4 |
|---|---|---|
| Water | 500 | 250 |
| Methanol | 100 | 350 |
| 28% Aqueous ammonia | 10 | 10 |
| Octadecyldimethyl(trimethoxysilylpropyl) ammonium chloride (40% methanolic solution) | 300 | 300 |
| N-(β-aminoethyl-γ-aminopropyltrimethoxysilane | — | 13 |
| Methyltrimethoxysilane | — | 150 |
| Normal ethyl silicate | 250 | — |

EXAMPLE 5

To 100 parts of polymethylsilsesquioxane with an average particle size of 2 μm obtained by contacting methyltrimethoxysilane with aqueous ammonia, as described in Japanese Unexamined Patent Publication No. 13813/1985, 100 parts of 0.8% methanolic solution of octadecyldimethyl[3-(trimethoxysilylpropyl]ammoniumchloride were added and well mixed by means of an automatic crucible. Subsequently, the mixture was dried at a temperature of 105° C. to obtain surface-treated polymethylsilsesquioxane fine powder (water content 3.2%, specific gravity 1.2). With an amount of 40% by weight of the fine powder as the dispersed phase component, an electroviscous fluid was obtained as the suspension according to the same recipe as in Example 1.

COMPARATIVE EXAMPLE 1

An amount of 13% by weight of a commercially available silica gel (Nipsil VN-3, manufactured by Nippon Silica) with a water content controlled to 6% by weight was well dispersed into 87% by weight of a silicone oil (TSF-451-20, manufactured by Toshiba Silicone K. K.) to obtain an electroviscous fluid for comparative purposes as the suspension.

COMPARATIVE EXAMPLE 2

An amount of 40% by weight of silicone resin fine particles (Tospearl 120, manufactured by Toshiba Silicone K. K.) was well dispersed in 60% by weight of a silicone oil (TSF 451-20, manufactured by Toshiba Silicone K. K.) to obtain an electroviscous fluid for comparative purposes as the suspension.

COMPARATIVE EXAMPLE 3

To 100 parts by weight of lithium polyacrylate obtained by neutralization of a commercially available polyacrylic acid with lithium hydroxide, 5 parts by weight of water were added to be contained therein, and an amount of 40% by weight of the resulting lithium polyacrylate with an average particle size of about 10 μm in a form of pulverized divided particles was well dispersed in 60% by weight of a silicone oil (TSF451-20, manufactured by Toshiba Silicone K. K.) to provide an electroviscous fluid for comparative purposes as the suspension.

TEST EXAMPLE

For the respective electroviscous fluids obtained in Example 1 and Comparative examples 1 to 3, the following tests were conducted.

SEDIMENTABILITY

A plate was suspended in the electroviscous fluid and the weight was measured.

ELECTROVISCOUS EFFECT (ELECTRICAL RESPONSE)

By use of a double cylindrical type rotational viscometer, the shearing force at the constant shearing rate (375 $S^{-1}$) when a voltage was applied between the inner and outer cylinders was evaluated.

The test results of sedimentability are shown in FIG. 1. In FIG. 1, the axis of abscissa shows the time elapsed after preparation (min.), and the axis of ordinate the sedimentation degree (0 when no sedimentation occurred, 1 when all was sedimented). In the Figure, the mark ○ (line A) indicates the electroviscous fluid of Example 1, the mark ◇ (line B) the electroviscous fluid of Comparative example 1, the mark △ (line C) that of Comparative example 2, and the mark □ (line D) that of Comparative example 3.

Figure 2:
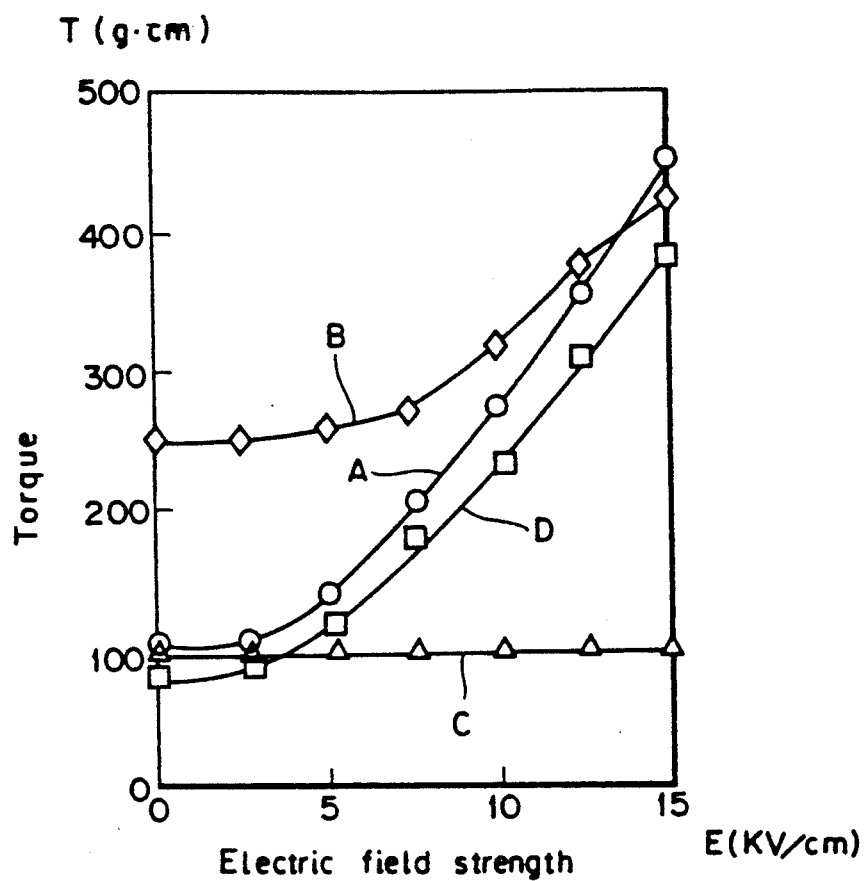
FIG. 2 is a diagram showing the relationshipt between the intensity of electric field and torque at a constant shearing rate, in which lines A, B, C and D correspond to the results of Example 1, Comparative examples 1, 2 and 3, respectively.

The test results of the electroviscous effect are shown in FIG. 2. FIG. 2 shows the relationship between the electric field and the torque at a constant shearing rate. In FIG. 2, the axis of abscissa represents the intensity of electric field E (kV/cm), and the axis of ordinate the torque (g.cm). The meanings of the respective symbols in the Figure are the same as in FIG. 1.

Other than the above tests, the torque (To) of the electroviscous fluid of the respective Examples and Comparative examples when no electric field is applied, the ratio of the change in torque relative to the applied electric field and the critical electric field (Eo) are shown in Table 2. These respective characteristic values were determined according to the method shown in FIG. 3.

Figure 3:
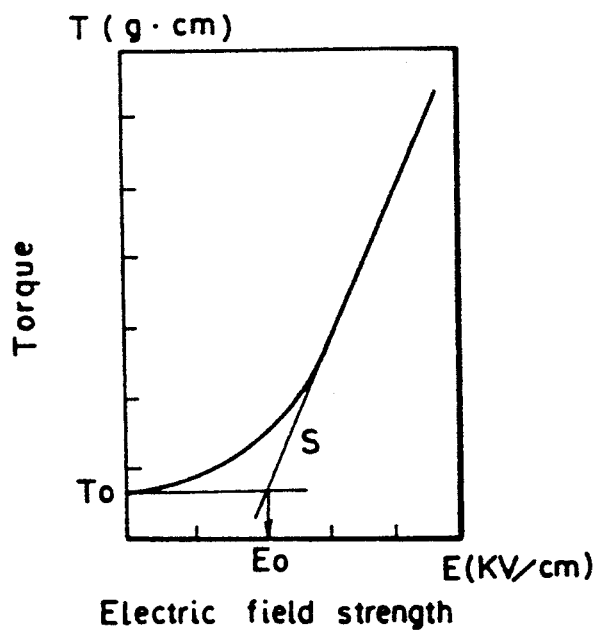
FIG. 3 is a diagram showing an analytical example of the parameters characterizing the relationship between the intensity of electric field and torque obtained in FIG. 2.

FIG. 3 shown an exemplary analysis of the parameters which characterize the relationship between the intensity of electric field and the torque as shown in FIG. 2, in which To, S and Eo have the same meanings as mentioned above.

TABLE 2

| Example No. | To (g·cm) | Eo (KV/cm) | S (g·cm²/KV) |
|---|---|---|---|
| Example 1 | 97 | 5.3 | 37.0 |
| Example 2 | 145 | 5.6 | 38.3 |
| Example 3 | 99 | 5.2 | 36.5 |
| Example 4 | 89 | 6.2 | 33.8 |
| Example 5 | 75 | 3.8 | 40.5 |
| Comparative example 1 | 255 | 7.5 | 22.8 |
| Comparative example 2 | 97 | No electroviscous effect | No electroviscous effect |
| Comparative example 3 | 81 | 4.8 | 30.5 |

As is apparent from FIG. 1, the electroviscous fluids of Example 1 and Comparative example 2 are stable with a small sedimentation rate, but it is difficult to apply the electroviscous fluids of Comparative example 1 or Comparative example 3 in practice as electroviscous fluids because solid fine particles are abruptly precipitated.

As is apparent from FIG. 2, concerning electrical response, the electroviscous fluids of Example 1 and Comparative example 3 both indicate abrupt torque increase momentarily responding to the applied voltage, thus satisfying the condition as the electroviscous fluid. On the other hand, the electroviscous fluid of Comparative example 1, although having the electroviscous effect, has a higher viscosity when no voltage is applied to be small in dyanamic range of the electroviscous effect. The electroviscous fluid of Comparative example 2 exhibits no electroviscous effect.

Thus, electroviscous fluids of Comparative example 1 and Comparative example 3 exhibit an electroviscous effect, but are low in stability. The electroviscous fluid of Comparative example 2 is good in stability, but exhibits no electroviscous effect. In contrast, the electroviscous fluid of Example 1 was found to be excellent in both electriviscous effect and stability.

Also, as is apparent from Table 2, the electroviscous effect of the electroviscous fluids of Examples 2 to 5 was found to be equal to or better than the dynamic range of the electroviscous effect of Comparative examples 1 and 3. Further, with respect to stability, Examples 2 to 5 were more stable than Comparative examples 1 and 3.

The electroviscous fluid of the present invention is substantially without sedimentation of the dispersed phase component and can maintain an excellent electrical response over a long time.

We claim:

1. An electroviscous fluid consisting essentially of
(a) 1 to 60% by weight of a dispersed phase consisting essentially of a fine powder of a silicone resin selected from the group consisting of (i) a homopolymer having $RSiO_{3/2}$ units, (ii) a polymer having $RSiO_{3/2}$ units and $SiO_2$ units and (iii) a copolymer comprising $RSiO_{3/2}$ units, $SiO_2$ units and $R_2SiO$ units, wherein R in said units is a monovalent hydrocarbon group having a quaternary ammonium salt group, or R is a methyl group, an ethyl group, a propyl group, a butyl group, a pentyl group, a hexyl group or a phenyl group, wherein 0.1 mol % or more of the substituents R are the monovalent hydrocarbon groups having a quaternary ammonium salt group and
the substituent R in the silicone resin other than the monovalent hydrocarbon groups having a quaternary ammonium salt group, is a methyl group, an ethyl group, a propyl group, a butyl group, a pentyl group, a hexyl group or a phenyl group, and wherein said dispersed phase has 0.1 to 20% by weight of water, has an average particle size of 0.05 to 100 μm and has a specific gravity prior to being dispersed of 0.9 to 1.3; and
(b) 40 to 99% by weight of a liquid phase consisting essentially of an electrically insulating oil having a viscosity of 25° C. of 0.65 to 500 cSt.

2. The electroviscous fluid according to claim 1, wherein said silicone resin fine powder is a copolymer comprising $RSiO_{3/2}$ units, $SiO_2$ units and $R_2SiO$ units, and the content of $RSiO_{3/2}$ units and $SiO_2$ units is 80 to 100 mol %.

3. The electroviscous fluid according to claim 1, wherein 0.1 mol % to 50 mole % of the substituents R in all the units are hydrocarbon groups having a quaternary ammonium salt group.

4. The electroviscous fluid according to claim 1, wherein said hydrocarbon group having a quaternary ammonium salt group is selected from the group consisting of hydrocarbon groups represented by the following formulae, and is bonded through the carbon atom of $Q^1$ to a silicon atom of said silicone resin:

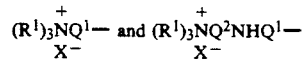

wherein $R^1$'s may be the same or different and each is an alkyl group having 1 to 20 carbon atoms; $X^-$ represents an anion; $Q^1$ represents an alkylene group having 3 to 6 carbon atoms; and $Q^2$ represents an alkylene group having 2 to 4 carbon atoms.

5. The electroviscous fluid according to claim 4, wherein $R^1$ is a methyl, ethyl, propyl, butyl, pentyl, hexyl, octyl, decyl, dodecyl, tetradecyl, hexadecyl, octadecyl or eicosyl group; the alkylene group having 3 to 6 carbon atoms for $Q^1$ is trimethylene, tetramethylene, pentamethylene or hexamethylene group; the alkylene group having 2 to 4 carbon atoms for $Q^2$ is an ethylene, trimethylene or tetramethylene group; and X which forms an anion of $X^-$ is a chlorine atom, a bromine atom or an iodine atom.

6. The electroviscous fluid according to claim 1, wherein said silicone resin fine powder is obtained by hydrolysis of a first alkoxysilane, said first alkoxysilane having a hydrocarbon group having a quaternary ammonium salt group or by cohydrolysis of said first alkoxysilane and a second alkoxysilane, said second alkoxysilane having a desired number of silicon functional groups other than said hydrocarbon group.

7. The electroviscous fluid according to claim 4, wherein said hydrocarbon group having a quaternary ammonium salt group is selected from the group consisting of

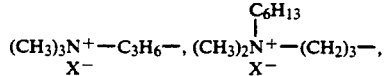

-continued

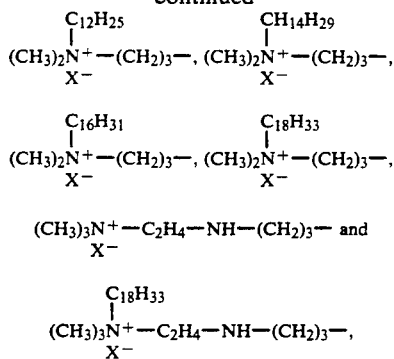

where X⁻ is an anion.

8. The electroviscous fluid according to claim 6, wherein said alkoxysilane is selected from the group consisting of

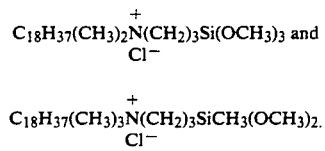

9. The electroviscous fluid according to claim 1, wherein said electrically insulating oil is selected from the group consisting of hydrocarbons, ester type oils, aromatic type oils and silicone oils.

10. The electroviscous fluid according to claim 9, wherein said electrically insulating oil is naphthenic oil.

11. The electroviscous fluid according to claim 1, wherein said electrically insulating oil is selected from the group consisting of polydimethylsiloxane and polymethylphenylsiloxane.

12. The electroviscous fluid according to claim 1, wherein said electroviscous fluid consists essentially of 40% by weight of the dispersed phase which consists essentially of fine powder of a silicone resin obtained by hydrolysis, followed by a polycondensation reaction, of octadecylmethyl(trimethoxysilylpropyl)ammonium chloride and methyltrimethoxysilane, said silicone resin fine powder having a water content of 2.3% by weight, said oil is silicone oil and 60% by weight of the silicone oil has a viscosity at 25° C. of 20 cSt.

13. The electroviscous fluid according to claim 1, wherein said electroviscous fluid consists essentially of 40% by weight of the dispersed phase which consists essentially of fine powder of a silicone resin obtained by hydrolysis, followed by a polycondensation reaction of octadecylmethyl(trimethoxysilylpropyl)ammonium chloride and normal ethyl silicate, said silicone resin fine powder having a water content of 3.4% by weight, said oil is silicone oil and 60% by weight of the silicone oil has a viscosity at 25° C. of 20 cSt.

14. The electroviscous fluid according to claim 1, wherein said electroviscous fluid consists essentially of 40% by weight of the dispersed phase which consists essentially of fine powder of a silicone resin obtained by hydrolysis, followed by a polycondensation reaction of octadecylmethyl(trimethoxysilylpropyl)ammonium chloride and methyltrimethoxysilane, said silicone resin fine powder having a water content of 2.1% by weight, said oil is silicone oil and 60% by weight of the silicone oil has a viscosity at 25° C. of 20 cSt.

15. The electroviscous fluid according to claim 1, wherein said electroviscous fluid consists essentially of 40% by weight of silicone resin which consists essentially of polymethylsilsesquioxane, whose surface is treated by octadecylmethyl(trimethoxysilylpropyl)ammonium chloride, said silicone resin fine powder having a water content of 3.2% by weight, said oil is silicone oil and 60% by weight of the silicone oil has a viscosity at 25° C. of 20 cSt.

16. The electroviscous fluid according to claim 1, wherein said fine powder has 0.5 to 5 weight % water.

17. The electroviscous fluid according to claim 1, wherein the fine powder has an average particle size of 1 to 20 μm.

18. The electroviscous fluid according to claim 1, wherein the weight % of the dispersed phase is 20 to 50% and the weight % of the liquid phase is 50 to 80%.

19. The electroviscous fluid according to claim 1, wherein said fine powder has 0.5 to 5 weight % water and said fine powder has an average particle size of 1 to 20 μm and wherein the weight % of the dispersed phase is 20 to 50% and weight % of the liquid phase is 50 to 80%.

* * * * *